US007535495B2

(12) United States Patent
Kitajima et al.

(10) Patent No.: US 7,535,495 B2
(45) Date of Patent: May 19, 2009

(54) DIGITAL CAMERA, CONTROL METHOD THEREOF AND PORTABLE TERMINAL

(75) Inventors: Tatsutoshi Kitajima, Tokyo (JP); Makoto Kanehiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/879,041

(22) Filed: Jun. 13, 2001

(65) Prior Publication Data

US 2002/0021361 A1 Feb. 21, 2002

(30) Foreign Application Priority Data

Jun. 14, 2000 (JP) ............................ 2000-179074

(51) Int. Cl.
*H04N 5/76* (2006.01)

(52) U.S. Cl. ..................................... 348/231.2; 386/96

(58) Field of Classification Search ............. 348/231.9, 348/231.2–231.7, 220.1; 386/96, 120, 121; 358/909.1
See application file for complete search history.

(56) References Cited

U.S. PATENT DOCUMENTS 4,544,960 A * 10/1985 Konishi ...................... 386/120
5,032,918 A * 7/1991 Ota et al. ................ 348/231.4
5,109,249 A 4/1992 Kitajima
5,229,805 A 7/1993 Kitajima
5,339,199 A * 8/1994 Ogawa ....................... 358/906
5,363,158 A * 11/1994 Stoneham .................... 352/27
5,376,965 A * 12/1994 Nagasaki et al. ......... 348/231.4
5,614,946 A * 3/1997 Fukuoka .................. 348/231.4
5,627,656 A * 5/1997 Sonohara et al. .............. 386/96
5,682,563 A 10/1997 Shinohara et al.
5,731,852 A * 3/1998 Lee ........................... 348/719
5,732,186 A * 3/1998 Yasumura et al. ........... 386/117
5,748,233 A 5/1998 Kitajima et al.
5,784,525 A * 7/1998 Bell ........................ 348/231.4
5,808,681 A 9/1998 Kitajima
5,812,736 A * 9/1998 Anderson .................... 386/96
5,815,201 A * 9/1998 Hashimoto et al. ....... 348/231.4

(Continued)

FOREIGN PATENT DOCUMENTS

JP 04-179379 6/1992

(Continued)

OTHER PUBLICATIONS

Frank, M., and Foley, J. Model-Based User Interface Design by Example and by Interview. ACM Press, Proceedings of the Sixth Annual ACM Symposium on User Interface Software and Technology, pp. 129-137. Nov. 3-5, 1993.*

(Continued)

*Primary Examiner*—Sinh Tran
*Assistant Examiner*—Yogesh Aggarwal
(74) *Attorney, Agent, or Firm*—Oblon, Spivak, McClelland, Maier & Neustadt, P.C.

(57) ABSTRACT

The digital camera includes a CPU which controls the operation of the digital camera. The digital camera has an audio recording mode in which sound data can be continuously recorded. If this audio recording mode is under execution and if the CPU receives an instruction, through the operation section, to capture a still image of an object, the CPU provides control to record the sound and the image data corresponding to the still image simultaneously.

12 Claims, 4 Drawing Sheets

HEADER
AUDIO DATA
HEADER
STILL IMAGE 1
HEADER
STILL IMAGE 2
ONE FILE
TYPE OF DATA
RECORDING START TIME
RECORDING END TIME
PRESENCE/ABSENCE OF RELATED STILL IMAGE
STORAGE ADDRESS OF RELATED STILL IMAGE
TIME WHEN RELATED IMAGE IS CAPTURED

U.S. PATENT DOCUMENTS

| | | | | |
|---|---|---|---|---|
| 5,913,011 | A * | 6/1999 | Nagashima et al. | 386/120 |
| 5,937,100 | A | 8/1999 | Kitajima | |
| RE36,338 | E * | 10/1999 | Fukuoka | 348/231.4 |
| 6,014,170 | A * | 1/2000 | Pont et al. | 348/231.4 |
| 6,034,728 | A * | 3/2000 | Arena | 348/372 |
| 6,075,562 | A | 6/2000 | Sakaguchi et al. | |
| 6,093,019 | A * | 7/2000 | Morandi et al. | 433/29 |
| 6,157,771 | A * | 12/2000 | Brewer et al. | 386/111 |
| 6,226,449 | B1 * | 5/2001 | Inoue et al. | 348/231.4 |
| 6,229,566 | B1 * | 5/2001 | Matsumoto et al. | 348/231.2 |
| 6,334,025 | B1 * | 12/2001 | Yamagami | 386/96 |
| 6,359,649 | B1 * | 3/2002 | Suzuki | 348/220.1 |
| 6,381,398 | B1 * | 4/2002 | Yamauchi et al. | 386/52 |
| 6,452,628 | B2 * | 9/2002 | Kato et al. | 348/333.12 |
| 6,538,764 | B2 * | 3/2003 | Ueda | 358/1.16 |
| 6,658,196 | B2 * | 12/2003 | Sakai et al. | 386/55 |
| 6,683,649 | B1 * | 1/2004 | Anderson | 348/333.05 |
| 6,774,939 | B1 * | 8/2004 | Peng | 348/231.4 |
| 6,778,760 | B1 * | 8/2004 | Kagle | 386/96 |
| 2001/0013897 | A1 * | 8/2001 | Kowno et al. | 348/240 |
| 2001/0033733 | A1 * | 10/2001 | Yamagishi | 386/46 |
| 2002/0054218 | A1 * | 5/2002 | Kobayashi et al. | 348/220 |

FOREIGN PATENT DOCUMENTS

| | | | |
|---|---|---|---|
| JP | 04318683 | A * | 11/1992 |
| JP | 05-284445 | | 10/1993 |
| JP | 07-306933 | | 11/1995 |
| JP | 08-298614 | | 11/1996 |
| JP | 11-136623 | | 5/1999 |
| JP | 11136623 | A * | 5/1999 |
| JP | 11-177912 | | 7/1999 |

OTHER PUBLICATIONS

U.S. Appl. No. 10/796,022, filed Mar. 10, 2004, Kitajima.
U.S. Appl. No. 10/801,816, filed Mar. 17, 2004, Kitajima.
U.S. Appl. No. 09/617,112, filed Jul. 14, 2000, Pending.
U.S. Appl. No. 10/087,955, filed Mar. 5, 2002, Pending.
U.S. Appl. No. 10/230,162, filed Aug. 29, 2002, Pending.
U.S. Appl. No. 10/636,849, filed Aug. 8, 2003, Kitajima et al.
U.S. Appl. No. 10/764,450, filed Jan. 27, 2004, Kitajima.

* cited by examiner

CCD
CDS
A/D
DIGITAL SIGNAL PROCESSING CIRCUIT
COMPRESSION/ DECOMPRESSION CIRCUIT
DRAM
MEMORY CARD
OSD
LCD
DRIVER
SG
CPU
OPERATION SECTION
STROBOSCOPE
MICROPHONE
AMP/FILTER
A/D
AUDIO DATA COMPRESSION/ DECOMPRESSION CIRCUIT
D/A
AMP/FILTER
AUDIO OUT
1
2
3
4
5
6
7
8
9
10
11
12
13
14
15
16
17
18
19
20
21
22

FIG.2A STILL IMAGE CAPTURING BUTTON
FIG.2B STROBOSCOPE
FIG.2C VD
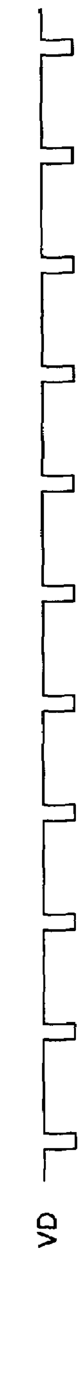
FIG.2D EXPOSURE
EXPOSURE
FIG.2E RECORDING OF STILL IMAGE ON MEMORY CARD
CAPTURE CCD DATA → YUV → JPEG → WRITE ON MEMORY CARD
FIG.2F CAPTURING OF AUDIO DATA
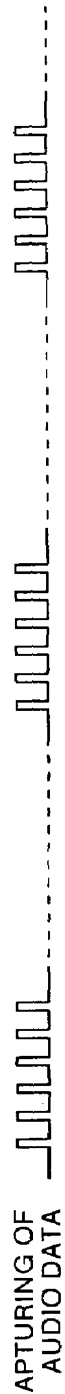
FIG.2G RECORDING OF AUDIO DATA ON MEMORY CARD

DIGITAL CAMERA, CONTROL METHOD THEREOF AND PORTABLE TERMINAL

FIELD OF THE INVENTION

The present invention relates to a digital camera, control method thereof and portable terminal and, more particularly to a digital camera capable of recording audio data and a method of recording images.

BACKGROUND OF THE INVENTION

Recently the digital cameras have become very common. These digital cameras have higher performance and they can undertake many functions. For example, digital cameras now can continuously record sounds.

However, there is a problem in the conventional digital cameras that a still image cannot be captured during recording of sounds. For example, when a still image of an object is to be captured while sound recording of a conference is going on, it is necessary to first stop the sound recording and then capture the image of the object. That is, it was impossible to perform sound recording and capturing a still image simultaneously.

SUMMARY OF THE INVENTION

It is an object of the invention to provide a digital camera, control method thereof and portable terminal capable of performing sound recording and capturing a still image simultaneously.

The digital camera according to this invention comprises an imaging unit which captures an object to acquire image data; an audio unit which converts received sounds into electric signals to acquire audio data; an operating unit for an operator to give operational instruction; and a recording unit which records the image data and the audio data on a recording medium in a predetermined format. The recording unit has an audio recording mode in which the audio data can be continuously recorded on the recording medium. If a specific operation of the operating unit is performed during execution of the audio recording mode, the recording unit stores image data corresponding to a still image of an object on the recording.

According to the above invention, the imaging unit images an object to acquire image data, the audio unit converts sounds into electric signals to acquire audio data, the operating unit gives an operational instruction of an operator, and the recording unit controls so that a static data of an object is recorded on the recording medium when a predetermined operational member of the operating unit is pressed down during execution of the audio recording mode for continuously recording audio data on the recording medium.

Other objects and features of this invention will become apparent from the following description with reference to the accompanying drawings.

BRIEF DESCRIPTION OF THE DRAWINGS

FIG. 2A to FIG. 2G are timing charts for explaining the operation when a still image capturing button of an operation section is pressed down when sounds are being recorded on a memory card in an audio recording mode;

DESCRIPTION OF THE PREFERRED EMBODIMENTS

Preferred embodiments of the present invention will be explained in detail with reference to the accompanying drawings.

Figure 1:
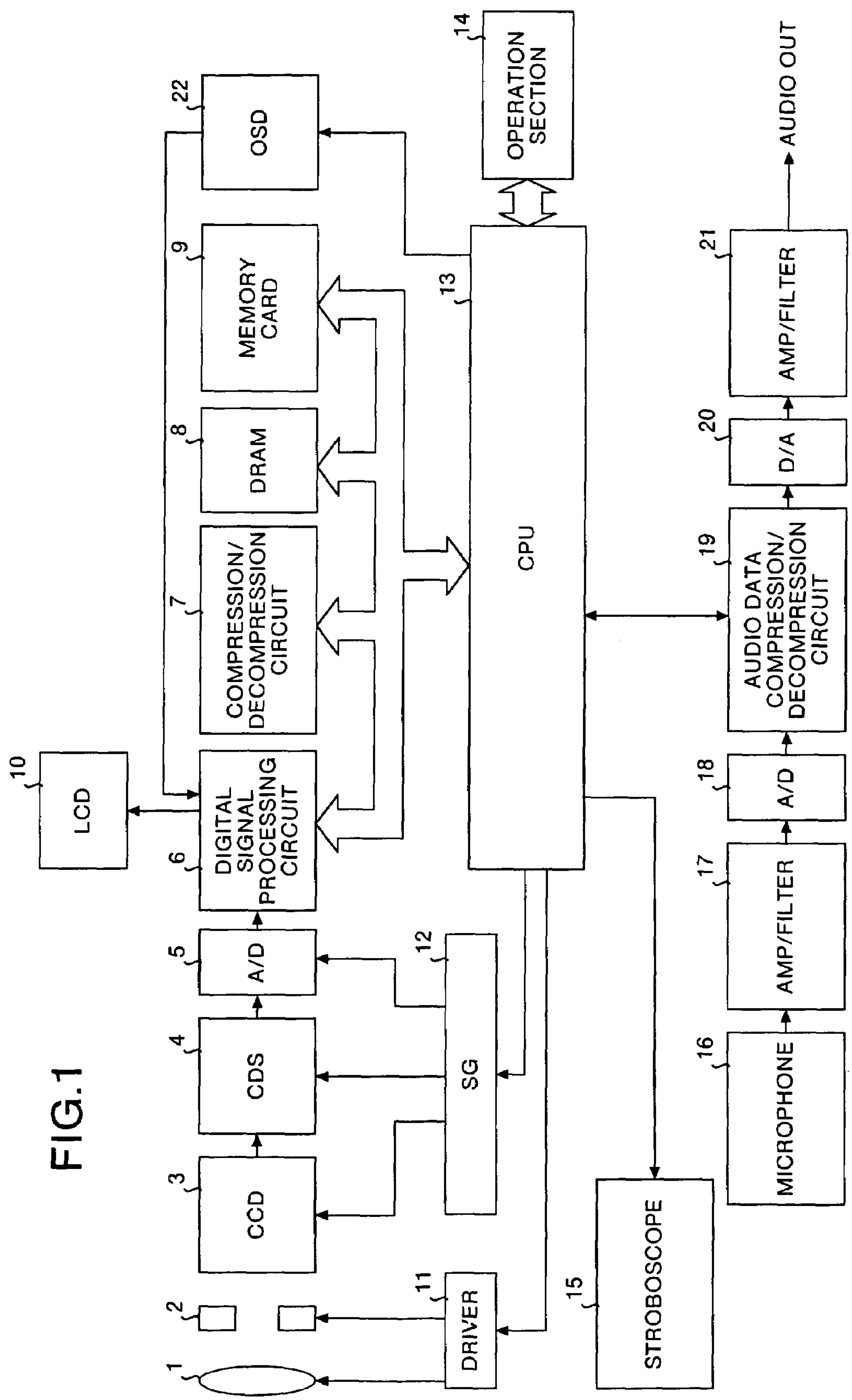
FIG. 1 is a block diagram showing one embodiment of a digital camera according to the present invention.

FIG. 1 is a block diagram showing one embodiment of a digital camera according to the present invention. The digital camera shown in FIG. 1 comprises the lens 1, mechanical mechanism 2 including automatic focus, CCD, CDS circuit 4, A/D converter 5, digital signal processing circuit 6, compression/decompression circuit 7, DRAM 8, memory card 9, LCD 10, driver 11, SG 12, CPU 13, operation section 14, stroboscope 15, microphone 16, AMP/filter 17, D/A converter 18, audio data compression/decompression circuit 19, A/D converter 20, AMP/filter 21, OSD 22 and the like.

A lens unit comprises the lens 1 and the mechanical mechanism 2 including automatic focus (AF), diaphragm, filter portion and the like, and a mechanical shutter of the mechanical mechanism 2 performs simultaneous exposure for two fields. The CCD (charge coupling device) 3 converts an image of an object inputted via the lens unit into an electric signal (analogue image data). The CDS (correlative double sampling) circuit 4 is a circuit for lowering the noise for the CCD-type imaging device. The A/D converter 5 converts the analogue image data inputted from the CCD 3 via the CDS circuit 4 into digital image data. That is, an output signal of the CCD 3 is converted into a digital signal of an optimum sampling frequency (for example, an integral multiple of sub carrier frequency of NTSC signal) by the A/D converter 5 through the CDS circuit 4.

Furthermore, the digital signal processing circuit 6 performs data processing for various processes, correction and image compression/decompression while separating the image data inputted from the A/D converter 5 into color difference data and brightness data (RGB to YUV conversion).

The image compression/decompression circuit 7 performs compression of inputted image data and decompression of inputted compressed image data and performs, for example, orthogonal transformation/inverse orthogonal transformation which is one process of image compression/decompression in conformity with JPEG, Huffman coding/Huffman decoding which is one process of image compression/decompression in conformity with JPEG and the like.

The microphone 16 converts an electric signal into audio data. The AMP/filter 17 amplifies audio data while cutting it off to a necessary band. The A/D converter 18 converts inputted audio data into digital audio data of a sampling frequency which is more than or equal to twice a predetermined band. The audio data compression/decompression circuit 19 performs compression and coding process/decoding process of digital audio data. The D/A converter 20 converts digital audio data into analogue audio data. The AMP/filter 21 amplifies audio data while cutting it off to a necessary band.

The DRAM 8 temporarily stores image data having been subjected to compression process. The memory card 9 records compressed image data and compressed audio data.

Furthermore, an image corresponding to the image data recorded on the memory card 9 is displayed in the LCD 10. Also, the LCD 10 displays the state of the digital camera, such as mode display being set and error display, for example. The operation section 14 is equipped with buttons for externally making various settings such as mode selection, function selection, imaging instruction and others.

The CPU 13 controls operation of each part of the digital camera according to a control program stored in an ROM (not shown), in response to an instruction from the operation section 14 or an external operational instruction by a remote controller or the like (not shown). For example, the CPU 13 performs control of recording operation of image data and audio data onto the memory card 9, control of reproducing operation of image data file and audio data file recorded on the memory card 9 and the like.

The CPU 13 described above is provided with a still image recording mode for imaging still images and record them on the memory card 9, a motion picture mode for imaging moving images and recording them on the memory card 9, an audio recording mode for recording sounds on the memory card 9, an image reproducing mode for reproducing on the LCD 10 images recorded on the memory card 9, an audio reproducing mode for reproducing audio data recorded on the memory card 9 and the like. Furthermore, the digital camera is so configured that when the still image capturing button on the operation section 14 is pressed down during execution of the audio recording mode, even the still images can be captured concurrently. In addition, when the still image capturing button on the operation section 14 is pressed down during execution of the motion picture mode, even the still images can be captured concurrently. In this case, it is possible to record the still images with higher quality than the quality with which the moving images are recorded.

Recording of image data in the digital camera of FIG. 1 will be explained. First, when the still image capturing button on the operation section 14 is pressed down, an image of an object via the lens is converted into an electric signal (analogue image data) by the CCD 3 and then inputted to the A/D converter 5 through the CDS 4 where the analogue image data is converted into digital image data. The digital image data after conversion is subjected to signal processing in the digital signal processing circuit 6 and then stored in the DRAM 8 via a CPU bus. The digital image data stored in the DRAM 8 is inputted to the compression/decompression circuit 7 via the CPU bus, and again stored in the DRAM 8 after being compressed. Upon completion of the compression process, the CPU 13 records the compressed image data stored in the DRAM 8 on the memory card in a predetermined form as an image data file via the CPU bus.

Image reproduction in the digital camera of FIG. 1 will now be explained. When the image reproducing mode is selected by operating the operation section 14, and an image data file on the memory card 9 to be reproduced is designated, the image data after compression of the designated image data file is read out by the CPU 13 to be stored in the DRAM 8. The image data stored in the DRAM 8 is inputted to the compression/decompression circuit 7 via the CPU bus, and subjected to decompression process, and thereafter stored in the DRAM 8 again. The image data after decompression process stored in the DRAM 8 is inputted to the digital signal processing circuit 6 via the CPU bus and converted into a video signal to be displayed on the LCD 10.

Recording of audio data in the digital camera of FIG. 1 will now be explained. First, when the audio recording mode is selected by operating the operation section 14, sounds are converted into an electric signal by the microphone 16 to be audio data, and the audio data is converted into digital audio data of a sampling frequency more than or equal to twice the predetermined band by the A/D converter 18 after amplified and cut off to a necessary band by the AMP/filter 17. Furthermore, the digital audio data is subjected to compression and coding process by the audio data compression/decompression circuit 19, and then stored on the memory card 9 as an audio file in a predetermined form by the CPU 13.

Reproduction of audio data in the digital camera of FIG. 1 will now be explained. When the image reproducing mode is selected by operating the operation section 14 and an audio data file in the memory card 9 to be reproduced is designated, audio data after compression of the designated audio data file is read out by the CPU 13, subjected to decompression process by the audio data compression/decompression circuit 19, and D/A converted by the D/A converter 20, and thereafter, amplified by the AMP/filter 17 to be outputted from a speaker (not shown).

What happen when the still image capturing button on the operation section 14 is pressed down when the memory card 9 is recording sounds in the audio recording mode will be explained with reference to the timing charts of FIG. 2A to FIG. 2G. FIG. 2A to FIG. 2G show timing charts for explaining the operation when the still image capturing button on the operation section 14 is pressed down when the memory card 9 is recording sounds in the audio recording mode. FIG. 2A shows timing of manipulation of the still image capturing button, FIG. 2B shows timing of activation of the stroboscope, FIG. 2C shows timing of generation of the vertical synchronizing signal (VD), FIG. 2D shows timing of exposure of the CCD, FIG. 2E shows timing of recording of the still image data on the memory card, FIG. 2F shows timing of capturing of audio data to a work memory, and FIG. 2G shows timing of writing of audio data to the memory card 9, respectively.

When the audio recording mode is selected by the operation section 14, as shown in FIG. 2F, sounds are captured by the microphone 16, converted into audio data, amplified and cut off to a necessary band by means of the MP/filter 17, and thereafter converted into digital audio data of a sampling frequency more than or equal to twice a predetermined band by the A/D converter 18. Furthermore, the digital audio data is compressed and coded by the audio data compression/decompression circuit 19, and then stored in the memory card 9 by the CPU 13 as shown in FIG. 2G.

If the still image capturing button on the operation section 14 is pressed down as shown in FIG. 2A during continuous audio recording under the audio recording mode, recording of still images is performed concurrently with the recording of audio data. Specifically, first, as shown in FIG. 2D, exposure of the CCD 3 is performed, and image data is captured via the lens 1 and the CCD 3, and the digital image data (RGB data) having passed the CDS 4 and the A/D converter 5 is signal processed by the digital signal processing circuit 6 (RGB to YUV conversion and the like) to be stored in the DRAM 8. The digital image data thus stored in the DRAM 8 is inputted to the compression/decompression circuit 7 via the CPU bus, and subjected to compression process (for example, JPEG compression), and thereafter stored in the DRAM 8 again. Then by means of the CPU 13, the image data after compression stored in the DRAM 8 is to be recorded on the memory card 9 via the CPU bus.

Figure 3:
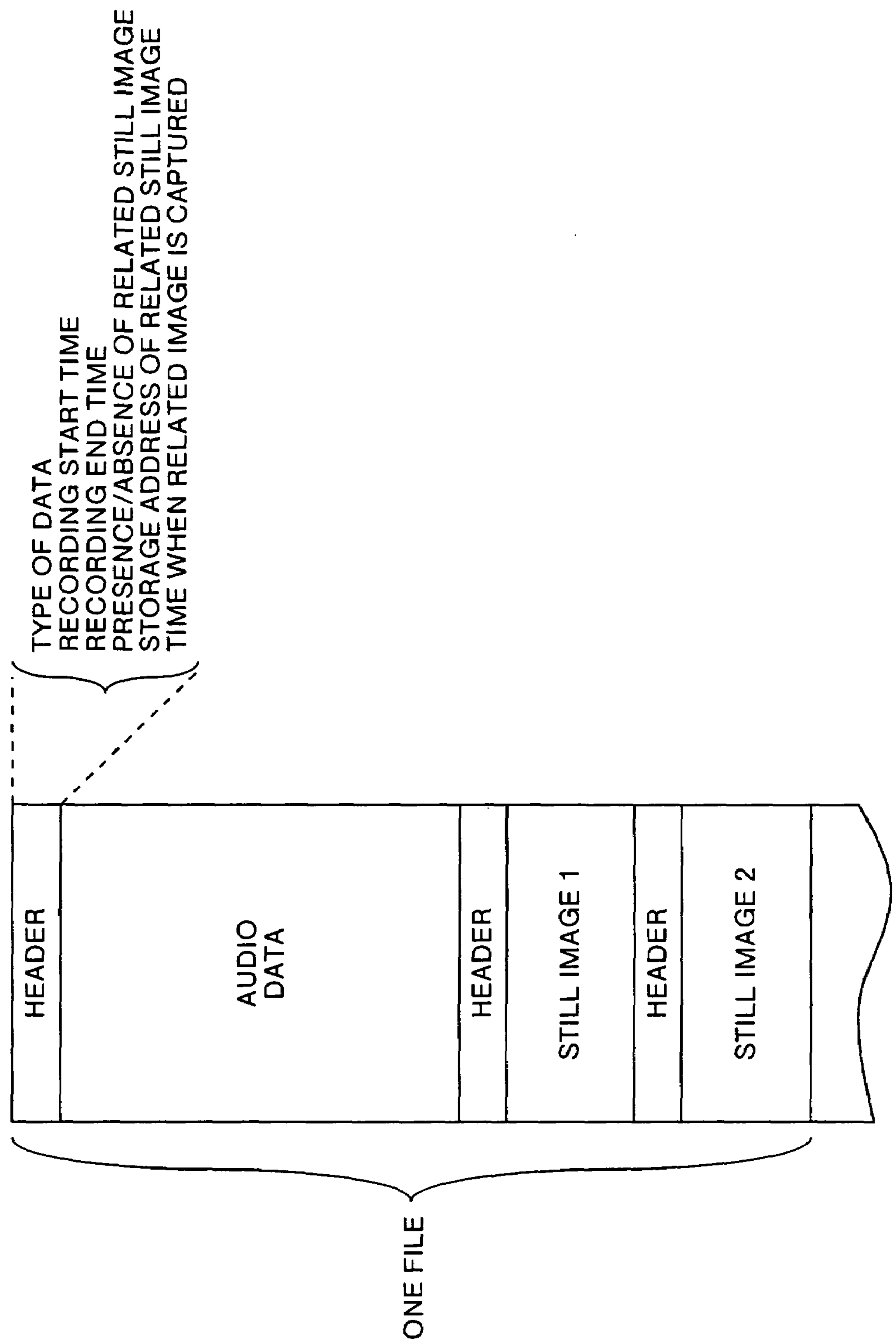
FIG. 3 is a view showing one example of a recording format of a memory card when the audio data recorded in the audio recording mode and the still image data recorded when the still image capturing button is pressed down during execution of the audio recording mode are recorded as the same file.

FIG. 3 is a view showing one example of a recording format of the memory card 9 when the audio data recorded in the audio recording mode and the still image data recorded when the still image capturing button is pressed down during execution of the audio recording mode are recorded as the same file.

The example shown in FIG. 3 represents the case where two still images are imaged by pressing of the still image capturing button twice when audio data is being recorded continuously in the audio recording mode, wherein the still image data captured by the first pressing of the still image capturing button is defined as still image 1 data, and the still image data captured by the second pressing of the still image capturing button is defined as still image 2 data.

The file in FIG. 3 consists of audio data and a header of the audio data, still image 1 data and a header of the still image 1 data, and still image 2 data and a header of the still image 2 data. The header of the audio data stores data regarding type of the data, recording start time and recording end time of the audio data, presence/absence of related still image, storing address of the related still image, time that the related still image is captured and the like. The headers of the still images 1, 2 data store data regarding type of the data, time that the date is captured and the like. The file format of the present case may be the TIFF format.

When reproduction of the file is designated by the operation section 14, the CPU 13 reproduces the audio data while reproducing the still image 1 data and the still image data 2 at the corresponding times. For example, when the recording start time and the recording end time of the audio data are 8:10:15 and 8:10:40, respectively, the recording time of the still image 1 is 8:10:20, and the recording time to the still image 2 is 8:10:30, the still image 1 is reproduced 5 seconds after stating of reproduction of the audio data, and the still image 2 is reproduced 10 seconds after the still image 1 is reproduced.

Furthermore, when deletion of the reproduced still image is designated by the operation section 14, the CPU 13 deletes the corresponding still image data and header stored in the memory card 9, while deleting the data regarding address, recording time and the like of the corresponding still image data of the header of the audio data. Furthermore, when file division of the data recorded in the same file is designated by the operation section 14, the CPU 13 divides the audio data and the still image data into different files.

A case in which the audio data recorded in the audio recording mode and the still image data recorded when the still image capturing button on the operation section 14 is pressed down during execution of the audio recording mode are recorded as the same file is explained above. However, it is also possible to record the audio data recorded in the audio recording mode and the still image data recorded when the still image capturing button is pressed down during execution of the audio recording mode as different files.

Figure 4:
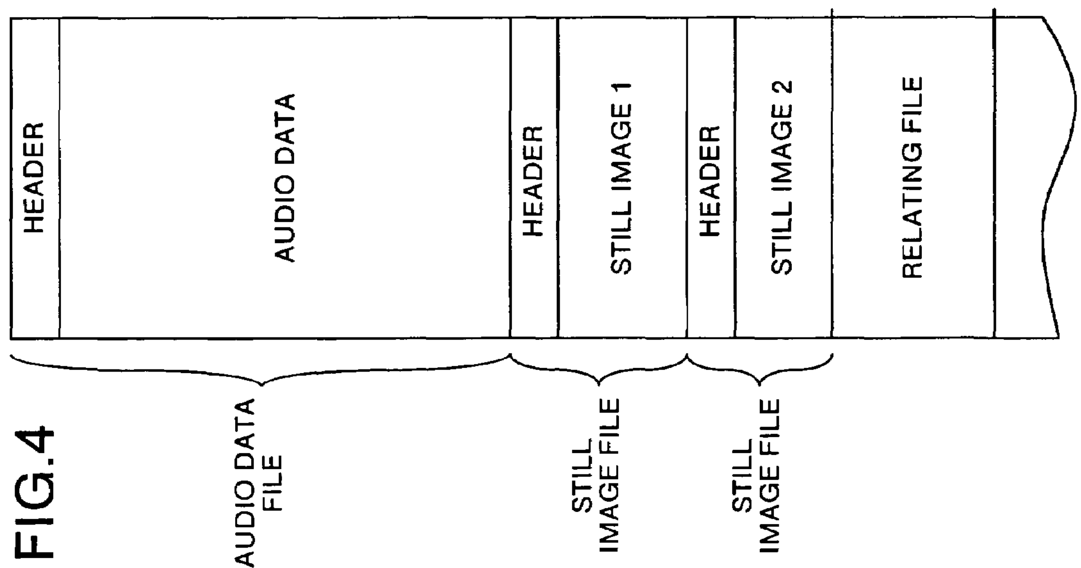
FIG. 4 is a view showing one example of a recording format of a memory card in when the audio data recorded in the audio recording mode and the still image data recorded when the still image capturing button is pressed down during execution of the audio recording mode are recorded as different files.

FIG. 4 is a view showing one example of a recording format of the memory card 9 when the audio data recorded in the audio recording mode and the still image data recorded when the still image capturing button is pressed down during execution of the audio recording mode are recorded as different files.

The example shown in FIG. 4 represents the case where two still images are imaged by pressing of the still image capturing button twice when audio data is being recorded continuously in the audio recording mode, wherein the still image data captured by the first pressing of the still image capturing button is defined as still image 1 data, and the still image data captured by the second pressing of the still image capturing button is defined as still image 2 data.

In FIG. 4, the audio data is stored as an audio data file, the still image 1 data is as a still image 1 file, and the still image 2 data as a still image 2 file, and additionally a relating file for relating the audio data file, the still image 1 file and the still image 2 file is stored. The relating file stores the address and recording start time and recording end time of the vice data file, the address and imaging time of the still image 1 file and the address and imaging time of the still image 2 file.

When reproduction of the audio file is designated by operating the operation section 14, the CPU 13 judges whether a relating file corresponding to that audio file exists or not, and if there is not a relating file, the CPU 13 reproduces only audio data, while on the other hand, if there is a relating file, the CPU 13 reproduces the audio data of the audio file while reproducing the still image data of the still image file at the corresponding time. Similar to the above, for example, when the recording start time and the recording end time of the audio data are 8:10:15 and 8:10:40, respectively, the recording time of the still image 1 is 8:10:20, and the recording time of the still image 2 is 8:10:30, the still image 1 is reproduced 5 seconds after stating of reproduction of the audio data, and the still image 2 is reproduced 10 seconds after the still image 1 is reproduced.

While in FIGS. 3 and 4 described above, the time when the still image is captured is recorded at the time when the still image capturing button is pressed down during continuous recording of sounds in the audio recording mode, it is also possible to record the time (relative time) from the time when audio recording in the audio recording mode is started to the time when the still image capturing button is pressed down. In such a case, the still image may be reproduced when the above-mentioned relative time has lapsed after starting reproduction of the audio data.

As described above, according to the present embodiment, the time when the still image is captured is recorded at the time when the still image capturing button is pressed down during continuous recording of sounds in the audio recording mode. Therefore, it becomes possible to image a still image when sounds are continuously recorded in the audio recording mode and hence it is possible to perform required imaging of the object even when sounds are being continuously recorded, which provides improved operability for the operator.

Furthermore, audio data and the still image data are stored in the same file when the still image capturing button is pressed down during when sounds are being continuously recorded in the audio recording mode. Therefore, handling of data between devices becomes convenient.

Furthermore, audio data and the still image data are stored as the same file when the still image capturing button is pressed down when sounds are being continuously recorded mall in the audio recording mode. Therefore, necessity of special software is eliminated and it becomes possible to reproduce each file separately by other devices manufactured by other manufactures.

Furthermore, the time when the sound is recorded (recording start time and recording end time) and the time when the still image is captured are stored in the memory card. Therefore, it is possible to perform reproduction in accordance with the time relationship.

The present invention is not limited to the above embodiments, but can be practiced while being appropriately modified without departing from the scope of the invention.

As described above, according to the digital camera of the present, the imaging unit images an object to acquire image data, the audio unit converts sounds into electric signals to acquire audio data, the operating unit gives an operational instruction of an operator, and the recording unit controls so that a static data of an object is recorded on the recording medium when a predetermined operational member of the operating unit is pressed down during execution of the audio recording mode for continuously recording audio data on the recording medium, it is becomes possible to record still images during recording of sounds, so that the operability for the operator improves.

Furthermore, according to the digital camera of the second aspect, since the recording unit records the audio data recorded in the audio recording mode and the still image data of the object which is recorded when the predetermined operational member of the operating unit is pressed down during execution of the audio recording mode on the recording medium as the same file in the digital camera of the first aspect, handling of data between devices becomes convenient in addition to the effect of the invention according to the first aspect.

Furthermore, according to the digital camera of the third aspect, since the recording unit records the audio data recorded in the audio recording mode and the still image data of the object which is recorded when the predetermined operational member of the operating unit is pressed down during execution of the audio recording mode on the recording medium as different files in the digital camera of the first aspect, in addition to the effect of the invention according to the first aspect, it is possible to handle the continuous data and the still image data as the different files, which simplifies manipulations such as deletion of unnecessary data and eliminates necessity of special reproduction software, so that it becomes possible to reproduce each file separately with the use of other devices produced by other manufacturers.

Furthermore, according to the digital camera of the fourth aspect, since the recording unit creates a relating file which stores data for correlating the audio data recorded in the audio recording mode and the still image data of the object which is recorded when the predetermined operational member of the operating unit is pressed down during execution of the audio recording mode in the digital camera of the third aspect, in addition to the effect of the invention according to the third aspect, it becomes possible to correlate the audio data recorded in the audio recording mode and the still image data of the object which is recorded when the predetermined operational member of the operating unit is pressed down during execution of the audio recording mode.

Furthermore, according to the digital camera of the fifth aspect, since the recording unit records data representing time relationship between the audio data recording in the audio recording mode and the still image data of the object which is recorded when the predetermined operational member of the operating unit is pressed down during execution of the audio recording mode on the recording medium in the digital camera according to any one of the first to fourth aspects, in addition to the effect of the invention according to any one of the first to fourth aspects, it becomes possible to perform reproduction in accordance with the time relationship.

Furthermore, according to the digital camera of the sixth aspect, since the recording unit divides the audio data and the still image data recorded as the same file into separate files in accordance with an instruction by the operating unit in the digital camera of the second aspect, in addition to the effect of the invention according to the second aspect, it is possible to improve the flexibility of file management.

Furthermore, according to the digital camera of the seventh aspect, since the recording unit deletes the still image data recorded as the same file in accordance with an instruction by the operating unit in the digital camera of the second aspect, in addition to the effect of the invention, it becomes possible to delete unnecessary still image data.

The present document incorporates by reference the entire contents of Japanese priority document, 2000-179074 filed in Japan on Jun. 14, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital camera comprising:

an imaging unit which captures an object to acquire image data;

an audio unit which converts received sounds into electric signals to acquire audio data;

an operating unit for an operator to give an operational instruction; and a recording unit which records the image data and the audio data on a recording medium, which is a final camera memory, in a predetermined format, said recording unit having a still image recording mode in which still images can be recorded on said recording medium, a motion picture recording mode in which moving images can be recorded on said recording medium, and an audio recording mode in which the audio data can be recorded on said recording medium, wherein when a still image capturing button is operated during execution of the audio recording mode, said recording unit stores for one operation of the still image capturing button only one still image data corresponding to an object on said recording medium concurrently with storing said audio data on same said recording medium, wherein said recording unit records on said recording medium the audio data and the image data of the still image as one file and wherein said one file includes a header preceding the audio data and the image data of the still image, the header indicating a recording start time of the audio data, a recording end time of the audio data, a presence/absence of the still image, a storage address of the still image, and a time when the still image is captured, and wherein the header, the audio data, and the image data of the still image are arranged in this order in said one file, wherein when the still image capturing button is operated during execution of the audio recording mode for a plurality of times, the header, the audio data, and the image data of a plurality of the still images are arranged sequentially in this order in said one file.

2. The digital camera according to claim 1, wherein said recording unit, based on an instruction from said operating unit, separates the audio data and the image data from the one file into separate files.

3. The digital camera according to claim 1, wherein said recording unit, based on an instruction from said operating unit, deletes the image data from the one file.

4. The digital camera according to claim 1, wherein said one file further includes a header for each still image.

5. A digital camera comprising:

an imaging means for capturing an object to acquire image data;

an audio means for converting received sounds into electric signals to acquire audio data;

an operating means for an operator to give an operational instruction; and a recording means for recording the image data and the audio data on a recording medium, which is a final camera memory, in a predetermined format, said recording means having a still image recording mode in which still images can be recorded on said recording medium, a motion picture recording mode in which moving images can be recorded on said recording medium, and an audio recording mode in which the audio data can be recorded on said recording medium, wherein when a still image capturing button is operated during execution of the audio recording mode, said recording means stores for one operation of the still image capturing button only one still image data corresponding to an object on said recording medium concurrently with storing said audio data on same said recording medium, wherein said recording means records on said recording medium the audio data and the image data of the still image as one file, and wherein said one file includes a header preceding the audio data and the image data of the still image, the header indicating a recording start time of the audio data, a recording end time of the audio data, a presence/absence of the still image, a storage address of the still image, and a time when the still image is captured, and wherein the header, the audio data, and the image data of the still image are arranged in this order in said one file, wherein when the still image capturing button is operated during execution of the audio recording mode for a plurality of times, the header, the audio data, and the image data of a plurality of the still images are arranged sequentially in this order in said one file.

6. The digital camera according to claim 5, wherein said recording means, based on an instruction from said operating means, separates the audio data and the image data from the one file into separate files.

7. The digital camera according to claim 5, wherein said recording means, based on an instruction from said operating means, deletes the image data from the one file.

8. The digital camera according to claim 5, wherein said one file further includes a header for each still image.

9. A control method of a digital camera comprising the steps of:

capturing an object to acquire image data;

converting received sounds into electric signals to acquire audio data;

operating an operator to give an operational instruction; and recording the image data and the audio data on a recording medium, which is a final camera memory, in a predetermined format, said recording step having a still image recording mode in which still images can be recorded on said recording medium, a motion picture recording mode in which moving images can be recorded on said recording medium, and an audio recording mode in which the audio data can be recorded on said recording medium, wherein when a still image capturing button is operated during execution of the audio recording mode, said recording step stores for one operation of the still image capturing button only one still image data corresponding to an object on said recording medium concurrently with storing said audio data on same said recording medium, wherein said recording unit records on said recording medium the audio data and the image data of the still image as one file, and wherein said one file includes a header preceding the audio data and the image data of the still image, the header indicating a recording start time of the audio data, a recording end time of the audio data, a presence/absence of the still image, a storage address of the still image, and a time when the still image is captured, and wherein the header, the audio data, and the image data of the still image are arranged in this order in said one file, wherein when the still image capturing button is operated during execution of the audio recording mode for a plurality of times, the header, the audio data, and the image data of a plurality of the still images are arranged sequentially in this order in said one file.

10. The control method according to claim 9, wherein said one file further includes a header for each still image.

11. A portable terminal comprising:

an imaging unit which captures an object to acquire image data;

an audio unit which converts received sounds into electric signals to acquire audio data;

an operating unit for an operator to give an operational instruction; and a recording unit which records the image data and the audio data on a recording medium, which is a final camera memory, in a predetermined format, said recording unit having a still image recording mode in which still images can be recorded on said recording medium, a motion picture recording mode in which moving images can be recorded on said recording medium, and an audio recording mode in which the audio data can be recorded on said recording medium, wherein when a still image capturing button is operated still image capturing button is operated during execution of the audio recording mode, said recording unit stores for one operation of the still image capturing button only one still image data corresponding to an object on said recording medium concurrently with storing said audio data on same said recording medium, wherein said recording unit records on said recording medium the audio data and the image data of the still image as one file, and wherein said one file includes a header preceding said audio data and the image data of the still image, the header indicating a recording start time of the audio data, a recording end time of the audio data, a presence/absence of the still image, a storage address of the still image, and a time when the still image is captured, and wherein the header, the audio data, and the image data of the still image are arranged in this order in said one file, wherein when the still image capturing button is operated during execution of the audio recording mode for a plurality of times, the header, the audio data, and the image data of a plurality of the still images are arranged sequentially in this order in said one file.

12. The portable terminal according to claim 11, wherein said one file further includes a header for each still image.

* * * * *